US012587013B2

(12) United States Patent
Toyora

(10) Patent No.: US 12,587,013 B2
(45) Date of Patent: Mar. 24, 2026

(54) POWER MANAGEMENT DEVICE

(71) Applicant: TOYOTA JIDOSHA KABUSHIKI KAISHA, Toyota (JP)

(72) Inventor: Sachio Toyora, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

(21) Appl. No.: 18/221,927

(22) Filed: Jul. 14, 2023

(65) Prior Publication Data

US 2024/0079871 A1 Mar. 7, 2024

(30) Foreign Application Priority Data

Sep. 1, 2022 (JP) ................................. 2022-139458

(51) Int. Cl.
*H02J 3/00* (2026.01)
*H02J 3/001* (2026.01)
(52) U.S. Cl.
CPC .................................... *H02J 3/001* (2020.01)
(58) Field of Classification Search
CPC ........ H02J 3/001; H02J 2300/24; H02J 3/381; H02J 3/00; H02J 3/008; H02J 13/00001; H02J 13/00002; H02J 13/00032; H02J 2203/10
USPC ......................................................... 700/292
See application file for complete search history.

(56) References Cited

U.S. PATENT DOCUMENTS

| | | | | |
|---|---|---|---|---|
| 9,008,852 | B2 * | 4/2015 | Forbes, Jr. ........ | H02J 13/00006 700/286 |
| 11,451,065 | B1 * | 9/2022 | Worku ................. | G05B 19/042 |
| 2011/0140520 | A1 * | 6/2011 | Lee ....................... | H10F 77/955 307/25 |
| 2012/0130556 | A1 * | 5/2012 | Marhoefer ............. | G05B 15/02 700/291 |
| 2012/0271470 | A1 * | 10/2012 | Flynn ...................... | H02J 3/381 700/292 |
| 2015/0364919 | A1 * | 12/2015 | Schumer ................... | H02J 3/28 700/291 |
| 2019/0148941 | A1 * | 5/2019 | Wang ........................ | H02J 3/38 700/287 |

(Continued)

FOREIGN PATENT DOCUMENTS

| | | |
|---|---|---|
| JP | 2012-512619 A | 5/2012 |
| JP | 2020-107538 A | 7/2020 |

(Continued)

*Primary Examiner* — Christopher E. Everett
*Assistant Examiner* — Olvin Lopez Alvarez
(74) *Attorney, Agent, or Firm* — Oliff PLC

(57) ABSTRACT

The power management device includes a processor that functions to manage power exchange in a power system including a virtual power plant, and the processor includes a processor that, when an abnormality occurs in the power system and a cause of the abnormality is a voltage abnormality, causes the virtual power plant to exchange electric power only in one direction for suppressing the power abnormality, and when the cause of the abnormality is a frequency abnormality, causes the virtual power plant to exchange electric power within a range in which the output variation is equal to or less than a predetermined value, and prohibits the exchange of electric power by the virtual power plant until recovery when the cause of the abnormality is a disconnection failure or a short-circuit failure.

1 Claim, 2 Drawing Sheets

(56)　　　　　　References Cited

U.S. PATENT DOCUMENTS

2019/0258212 A1 * 　8/2019　Morton ..................... H02J 3/46
2021/0407757 A1 　12/2021　Osada
2022/0149619 A1 * 　5/2022　Harsamizadeh Tehrani ................
　　　　　　　　　　　　　　　　　　　　　G06Q 50/06
2022/0200285 A1 * 　6/2022　Hamada .................. H02J 3/381
2023/0333525 A1 * 10/2023　Ichi ........................ G05B 15/02

FOREIGN PATENT DOCUMENTS

JP　　　　　2022-108919　A　　7/2022
WO　　　　2010/077830　A2　　7/2010

* cited by examiner

FIG. 2

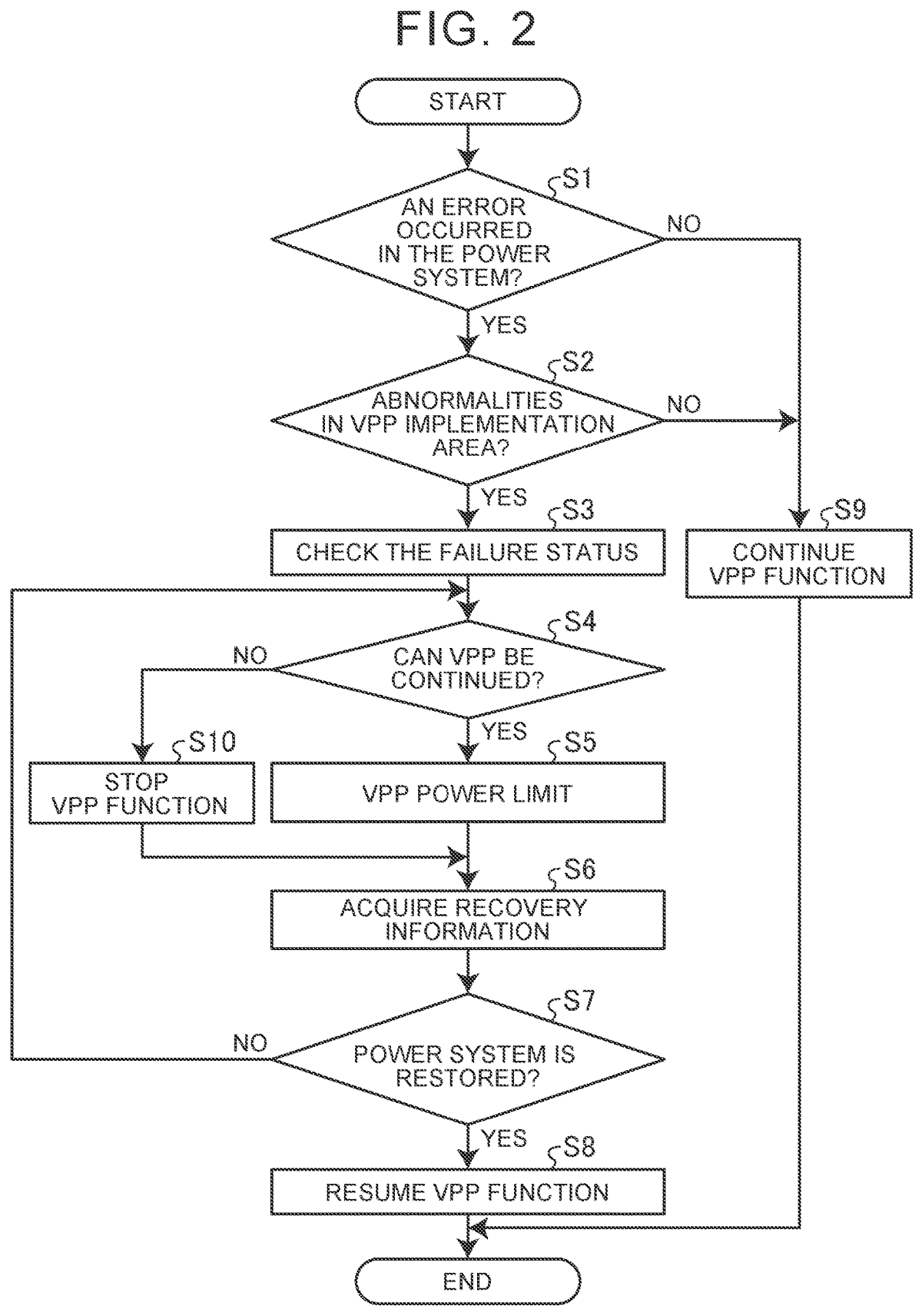

START

S1
AN ERROR OCCURRED IN THE POWER SYSTEM? — NO

YES

S2
ABNORMALITIES IN VPP IMPLEMENTATION AREA? — NO

YES

S3
CHECK THE FAILURE STATUS

S9
CONTINUE VPP FUNCTION

S4
CAN VPP BE CONTINUED? — NO

YES

S10
STOP VPP FUNCTION

S5
VPP POWER LIMIT

S6
ACQUIRE RECOVERY INFORMATION

S7
POWER SYSTEM IS RESTORED? — NO

YES

S8
RESUME VPP FUNCTION

END

POWER MANAGEMENT DEVICE

CROSS-REFERENCE TO RELATED APPLICATION

This application claims priority to Japanese Patent Application No. 2022-139458 filed on Sep. 1, 2022, incorporated herein by reference in its entirety.

BACKGROUND

1. Technical Field

The present disclosure relates to a power management device.

2. Description of Related Art

Japanese Unexamined Patent Application Publication No. 2020-107538 (JP 2020-107538 A) discloses a technique for managing an abnormal state and a failure state of a power grid.

SUMMARY

Since an abnormality in an electric power system may be caused by various causes, there has been a demand for a technique capable of managing an exchange of electric power in accordance with the content of the abnormality.

The present disclosure has been made in view of the above, and an object of the present disclosure is to provide a power management device capable of managing an exchange of electric power in accordance with the content of an abnormality.

A power management device according to the present disclosure includes a processor configured to function to manage an exchange of electric power in a power system including a virtual power plant. When an abnormality has occurred in the power system, in a case where a cause of the abnormality is a voltage abnormality, the processor causes the virtual power plant to perform the exchange of the electric power in only one direction that suppresses a power abnormality, in a case where the cause of the abnormality is a frequency abnormality, the processor causes the virtual power plant to perform the exchange of the electric power within a range in which an output fluctuation is equal to or less than a predetermined value, and in a case where the cause of the abnormality is a disconnection failure or a short-circuit failure, the processor prohibits the exchange of the electric power by the virtual power plant until failure recovery.

According to the present disclosure, it is possible to manage the exchange of the electric power in accordance with the content of the abnormality.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a flow of a power management method executed by the power management device according to the embodiment.

DETAILED DESCRIPTION OF EMBODIMENTS

Figure 1:
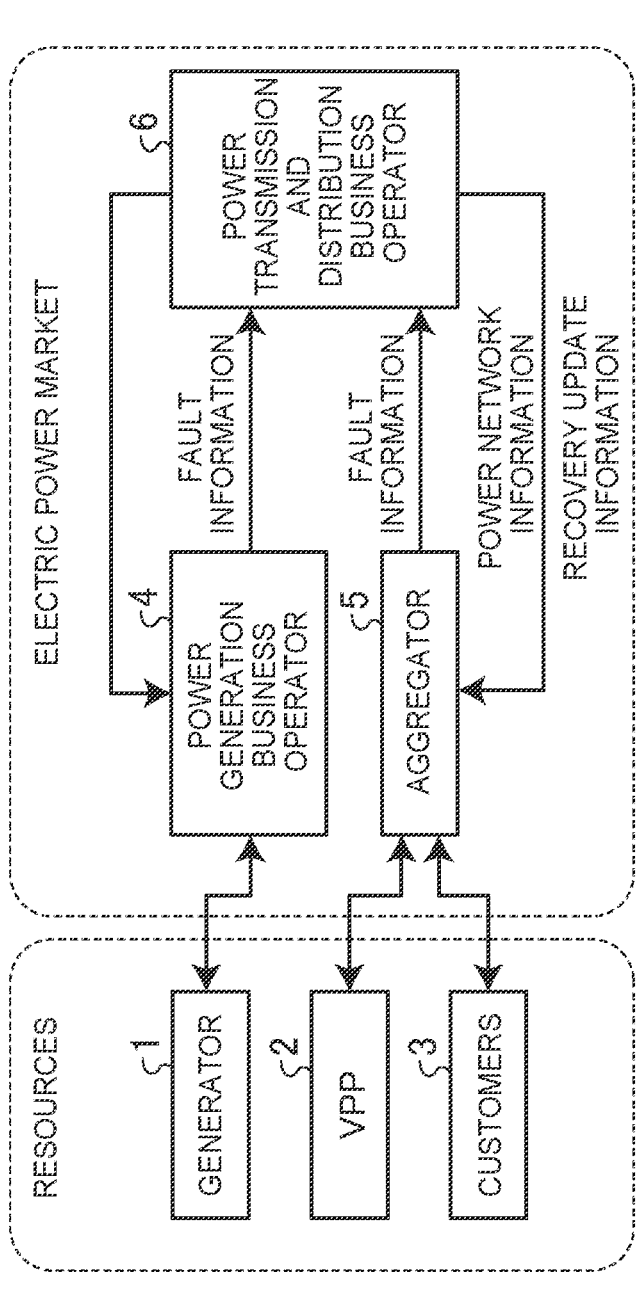
FIG. 1 is a diagram illustrating an example of a power system to which a power management device according to an embodiment is applied.

A power management device according to an embodiment of the present disclosure will be described with reference to the drawings. Note that, constituent components in the following embodiment also include those that can be easily replaced by those skilled in the art, or those that are substantially identical.

FIG. 1 illustrates an example of a power system to which a power management device according to an embodiment is applied. The power system includes a generator 1, a Virtual Power Plant (VPP) 2, and a consumer 3. Further, the power system includes a power generation business operator 4, an aggregator 5, and a power transmission and distribution business operator 6 as the power market side. VPP 2 in the power system is performed by the aggregator 5. VPP 2 has a charge control function and a power generation control function.

In the power system as illustrated in FIG. 1, VPP 2 function (hereinafter, referred to as "VPP function") may be stopped due to an abnormal power system, for example, a power failure. In such cases, when VPP function is resumed after the temporary power system is restored, it is assumed that the possibility of a power system voltage drop, a power failure occurring again, or the like becomes higher.

Examples of the cause of the abnormality in the power system include the following.
(1) Voltage error
(2) Frequency error
(3) Disconnection failure
(4) Short circuit failure Among the above, in the case of a failure caused by a distribution network, such as (3) a disconnection failure or (4) a short-circuit failure, it can be expected that the cause of the failure has been removed by the inspection of the power transmission and distribution business operator at the time of recovery. On the other hand, in the case of (1) a voltage abnormality or (2) a frequency abnormality, there is a high possibility that an abnormality has occurred due to a loss of balance with the generator 1 and the load, and there is no possibility that the cause of the abnormality can be expected to be eliminated at the time of recovery. Therefore, when VPP function is resumed, there is a possibility that a power failure or the like may occur again and a power failure may occur again. Therefore, in the power management device according to the embodiment, the robustness of VPP function is improved by determining the cause of the failure, determining the resumption of VPP function, and the like.

The power management device according to the embodiment is provided in, for example, the aggregator 5 in the power system shown in FIG. 1. The power management device is realized by a general-purpose computer such as a workstation or a personal computer. Further, the power management device includes a control unit realized by a processor made of, for example, Central Processing Unit (CPU) and a memory (main storage unit) made of, for example, Random Access Memory (RAM), Read Only Memory (ROM), and the like. The controller functions to manage the power exchange in the power system including the virtual power plant.

In the power system illustrated in FIG. 1, the power grid information, the failure information, and the recovery update information are shared among the respective operators. The power grid information is information on an area in which a failure (abnormality) has occurred and a status of an abnormality. The power grid data is transmitted to the aggregator 5 that implements VPP 2 through the power transmission and distribution business operator 6.

Further, the failure information is information related to "normal/abnormal" of a resource, a power distribution facility, or the like detected at the time of failure. This failure information is shared among the respective operators (the power generation business operator 4, the aggregator 5, and the power transmission and distribution business operator 6) constituting the power market. Further, the recovery update information is update information in which it is confirmed that a resource, a power distribution facility, or the like is normal after the occurrence of an abnormality. This restoration update information is shared among the respective operators (the power generation business operator 4, the aggregator 5, and the power transmission and distribution business operator 6) constituting the power market.

When an abnormality occurs in the power system, the control unit of the power management device determines whether or not VPP function can be resumed according to the details of the abnormality, as shown in the following Table 1.

TABLE 1

| Error status detection | Whether or not VPP control can be resumed after a failure has occurred | Requirements for VPP Resume | Output limit |
|---|---|---|---|
| Voltage error | Some | Only in the power direction that suppresses voltage errors | Limited until full recovery |
| Frequency error | Some | Only requests that can be implemented with output fluctuations below a certain level | Limited until full recovery |
| Disconnection failure | Not possible | After complete recovery | NO |
| Short circuit failure | Not possible | After complete recovery | NO |

As shown in Table 1, the control unit causes VPP 2 to exchange power only in one direction for suppressing the power abnormality when the cause of the abnormality is a voltage abnormality. For example, when VPP 2 receives the failure information indicating that the failure has occurred because the power transmission equipment is smaller than the specified voltage, the control unit causes the power generation resource-side function only to be performed without causing the power transmission equipment to perform the demand-side operation.

In addition, as shown in Table 1, the control unit causes VPP 2 to exchange electric power within a range in which the output variation is equal to or less than a predetermined value when the cause of the abnormality is a frequency abnormality. For example, by suppressing the power variation due to VPP 2 to a certain level or less, the effect on the power distribution network can be reduced. Therefore, when the information indicating that the failure has occurred due to the frequency abnormality is obtained, the control unit performs an operation of suppressing the output fluctuation below the predetermined value even if there is a large output fluctuation request exceeding the predetermined value from the outside, for example.

In addition, as shown in the above-described Table 1, when the fault is caused by a disconnection fault or a short-circuit fault, the control unit prohibits power exchange by VPP 2 until recovery. As described above, the power management device according to the embodiment can appropriately resume VPP function and restrict the power output by obtaining the failure information of the respective resources, the power distribution network, and the recovery update information, thereby suppressing the abnormal re-occurrence of the power system and enabling the early resumption of VPP function.

A flow of a power management method executed by the power management device according to the embodiment will be described with reference to FIG. 2.

First, the control unit of the power management device determines whether or not an abnormality has occurred in the power system by acquiring failure data in the power system from the power transmission and distribution business operator 6 or the like (1*i*). If it is determined in S1 that an abnormality has occurred in the power system (Yes in S1), the control unit determines whether the abnormality is an abnormality in an area where VPP function is performed (S2). When it is determined in S2 that VPP function is performed in the area (Yes in S2), the control unit refers to the failure data and confirms the failure status (S3).

Subsequently, the control unit determines whether or not a part of VPP function (for example, the charge control function) can be continued based on the confirmed failure condition (S4). When it is determined in S4 that a part of VPP function can be continued (Yes in S4), the control unit performs, based on the above-described Table 1, the output limitation of VPP function according to the failure status and continues VPP function (S5).

Subsequently, the control unit acquires, from the power transmission and distribution business operator 6 or the like, the recovery-update data after the failure (S6). Subsequently, the control unit determines whether or not the power system has been restored based on the obtained restoration update data (S7). If it is determined in S7 that the power system has been restored (Yes in S7), the control unit resumes VPP function, terminates the limitation of VPP function (S8), and completes this process.

Here, if it is determined in S1 that no anomaly has occurred in the power system (No in S1), the control unit continues VPP function (S9) and completes this process. If it is determined in S2 that VPP function is not abnormal (No in S2), the control unit continues VPP function (S9) and completes this process.

If it is determined in S4 that a part of VPP function cannot be continued (No in S4), the control unit immediately stops VPP function (S10) and proceeds to S6 process. If it is determined in S7 that the power system has not been restored (No in S7), the control unit proceeds to S4.

In the power management device according to the embodiment described above, by changing the mode of power exchange according to the content of the abnormality, it is possible to secure an opportunity for power exchange while securing safety. Further, according to the power management device of the embodiment, it is possible to suppress an abnormal re-occurrence of the power system and to enable an early resumption of VPP function.

New advantageous effects or modified examples can be easily derived by those skilled in the art. Thus, the broader aspects of the disclosure are not limited to the specific details and representative embodiments presented and described above. Accordingly, various modifications can be made without departing from the spirit or scope of the general inventive concept as defined by the appended claims and their equivalents.

What is claimed is:

1. A power management device comprising:

a processor configured to function to manage an exchange of electric power in a power system including a virtual power plant, wherein when it is determined that an abnormality has occurred in the power system, and it is determined that either a charge control function or a power generation control function in the virtual power plant can be continued based on a type of the abnormality:

in a case where a cause of the abnormality is a voltage abnormality, the processor causes the virtual power plant to perform the exchange of the electric power in only one direction that suppresses a power abnormality, in a case where the cause of the abnormality is a frequency abnormality, the processor causes the virtual power plant to perform the exchange of the electric power within a range in which an output fluctuation is equal to or less than a predetermined value, and when it is determined that the abnormality has occurred in the power system, and it is determined that either the charge control function or the power generation control function in the virtual power plant cannot be continued based on the type of the abnormality, in a case where the cause of the abnormality is a disconnection failure or a short-circuit failure, the processor prohibits the exchange of the electric power by the virtual power plant until failure recovery, wherein the processor is further configured to resume the exchange of electric power upon restoring of the power system.

\* \* \* \* \*